United States Patent [19]
Larson, Jr.

[11] Patent Number: 5,539,635
[45] Date of Patent: Jul. 23, 1996

[54] RADIO STATION PROGRAM IDENTIFIER AND DISTRIBUTION SYSTEM

[76] Inventor: Ernest J. Larson, Jr., 7408 W. Shore Dr., Edina, Minn. 55435

[21] Appl. No.: 277,244

[22] Filed: Jul. 19, 1994

[51] Int. Cl.$^6$ .................................................. G06F 19/00
[52] U.S. Cl. ..................... 364/401 R; 235/375; 455/45; 455/154.1
[58] Field of Search .................................. 364/401, 402, 364/403; 235/375, 419; 369/2, 30, 6, 14, 15; 455/45, 66, 154.1, 156, 158, 186

[56] References Cited

U.S. PATENT DOCUMENTS

| | | | |
|---|---|---|---|
| 3,718,906 | 2/1973 | Lightner | 340/825.35 |
| 3,729,581 | 4/1973 | Anderson . | |
| 3,886,456 | 5/1975 | Gargini . | |
| 4,108,365 | 8/1978 | Hughes | 235/419 |
| 4,124,773 | 11/1978 | Elkins . | |
| 4,393,277 | 7/1983 | Besen et al. . | |
| 4,518,989 | 5/1985 | Yabiki et al. . | |
| 4,521,857 | 6/1985 | Reynolds, III | 364/439 |
| 4,540,851 | 9/1985 | Hashimoto . | |
| 4,616,263 | 10/1986 | Eichelberger . | |
| 4,766,581 | 8/1988 | Korn et al. | 369/30 |
| 4,789,863 | 12/1983 | Bush | 340/825.35 |
| 4,792,849 | 12/1988 | McCalley et al. . | |
| 4,797,913 | 1/1989 | Kaplan et al. | 379/91 |
| 4,805,217 | 2/1989 | Morihiro et al. | 381/35 |
| 4,841,562 | 6/1989 | Lem | 379/104 |
| 4,872,195 | 10/1989 | Leonard | 379/40 |
| 4,887,308 | 12/1989 | Dutton | 455/156 |
| 4,897,867 | 1/1990 | Foster et al. | 379/94 |
| 4,899,369 | 2/1990 | Kondziela | 379/101 |
| 4,899,370 | 2/1990 | Kameo et al. | 379/104 |
| 5,023,904 | 6/1991 | Kaplan et al. | 379/91 |
| 5,113,351 | 5/1992 | Bostic | 364/479 |
| 5,119,188 | 6/1992 | McCalley et al. | 358/86 |
| 5,168,481 | 12/1992 | Culbertson et al. | 369/2 |
| 5,214,792 | 5/1993 | Alwadish | 455/45 |
| 5,237,157 | 8/1993 | Kaplan | 235/375 |
| 5,247,347 | 9/1993 | Litteral et al. . | |

OTHER PUBLICATIONS

Business wire, 09 Feb. 1993, Mary Weller, "RCA Acquires Decision Inc.; Offers Complete Software Solution For Radio Station Programming, Operations".

Music & Media, 28 Nov. 1992, Pil, Mary Weller, "Radio Station Software; Programs That Meet Your Stations Needs".

The New York Times, Sunday, Sep. 4, 1994, p. F7, "A Radio Entrepreneur Reaches for the Interactive Age" by Michael Wilke.

Copyright World, Issue Thirty-five, Nov. 1993, p. 17, International News, "IBM to link up with Blockbuster for CD on demand service".

The New York Times, Jul. 5, 1993, Monday, Late Edition--Final, Section 1; p. 38; col. 4, by Sabra Chartrand, "A Memo Pad For Radios".

Pamphlet, "Let Your Ears Do The Browsing, " How to use the i-station, intouch group, inc. 1992.

Primary Examiner—Robert A. Weinhardt
Assistant Examiner—Hayward A. Verdun
Attorney, Agent, or Firm—Faegre & Benson

[57] ABSTRACT

A radio program distribution system for creating custom recordings containing a requested plurality of musical programs. The system stores digital copies of musical programs and can selectively copy the programs onto custom recordings. Each participating broadcaster transmits program information to the system about each broadcasted program, and the system creates an entry in a database identifying the program, the time, the date and the broadcaster of each broadcast by a participating broadcaster. The system is connected to a telephone network, allowing customers to call into the system and request a custom recording containing desired musical programs. The customer requests which musical programs are desired by giving the time, date and broadcaster of when the program was heard on the radio. The system allows a customer to hear a preview of each requested program, choose programs broadcast temporally close to a requested time, choose from a menu programs similar to a requested program, and select the radio station from a menu. The system creates a custom recording and ships it to the customer.

31 Claims, 2 Drawing Sheets

RADIO STATION PROGRAM IDENTIFIER AND DISTRIBUTION SYSTEM

BACKGROUND OF THE INVENTION

The commercial recording industry, while profitable, has a number of logistical problems. For example, recording companies often cannot produce and distribute sufficient copies of popular recordings within a period of time that is fast enough to take advantage of the popularity peak for the recording. Invariably there are lost sales by virtue of the fact that some consumers cannot obtain copies of a recording until after the popularity of that recording has ebbed. Another problem for recording companies is the large investment required in materials, labor and equipment for reproducing thousands and sometimes millions of copies of a recording.

On another scale, the retailer of commercial recordings, in order to provide customers with a large selection, must have a considerable inventory investment. Quite often, because of changes in the popularity of various types of music, the retailer is left with stock that can only be sold below the retailer's cost. The retailer also has costs associated with transportation and shoplifting.

Another phase of the problem in the recording industry may be viewed from the perspective of the consumer. The consumer must travel to a music store to make a purchase or wait a long time for a mail or phone order through a standard music club to arrive. Often, in the case of very popular recordings, the consumer must wait to obtain his copy because the retailer is temporally sold out. Another problem faced by the consumer is his lack of choice in selecting the recordings he wishes to purchase. Specifically, the vast majority of recordings are albums containing a number of musical selections. If the consumer wishes to obtain copies of only one or two of the selections in an album, he is often forced to purchase the entire album because the desired selections are not available as singles.

The recording industry produces a large amount of recorded material for distribution to the public. The industry's distribution system enables only a relatively small number of recorded works to be packaged and sent to retail outlets for purchase by the consumer. Unless the consumer is familiar with artists or has heard the recording on the radio or television and remembers the title of the recording and/or the artist's name, the consumer has no knowledge of what is in the wrapped package and has no opportunity to listen to the recording. Consequently, large amounts of commercial quality music go unpurchased.

Systems presently exist for vending recordings in non-traditional ways. In one variation of such a system, a customer uses a specialized vending machine, typically located in a music store, to enter the title of requested music programs that she would like on a custom recording. Data representing the music is transmitted from a central station to the vending machine where a custom recording is produced.

Some radio stations, particularly public radio stations broadcasting non-musical programs, broadcast an ordering number after each program which can be used by customers to call the radio station and order a transcript or a copy of the program.

In another type of system, a customer calls into a music ordering company. An operator talks to the customer, getting billing and shipment information as well as the titles of musical programs that the customer wants to purchase. The music ordering company holds an inventory of prerecorded selections, much like a music store, and ships the requested albums or singles to the customer. For radio stations which have set play lists that are shared with the music ordering company, a customer can give the operator the date, time and radio station of a program which she heard, and, if that radio station uses a set play list that is shared with the music ordering company, those particular prerecorded albums and singles can be identified and shipped to the customer. Overwhelmingly, however, public radio stations are the only stations that use set play lists.

SUMMARY OF THE INVENTION

The present invention relates to a method and a system allowing a consumer to listen to the radio and use a telephone to order a custom recording of musical programs which she heard broadcasted on the radio. A customer uses her telephone to call into the system and gives the date, time and broadcaster of when she heard each requested program broadcasted. The system then creates a custom recording of the requested programs and ships it to the customer.

The system stores copies of broadcasted programs on a program storage unit which has a database module for indexing the stored programs by time, date and broadcaster information. The system further includes a request processing unit for receiving and processing remote customer requests for custom recordings, and a network interface for linking remote requests appliances to the system. Interconnected to the program storage unit and the request processing unit is a central duplication station. The central duplication station is responsive to information from the request processing unit and creates a custom recording of requested programs. The system also includes a shipping unit for shipping custom recordings to customers.

DETAILED DESCRIPTION OF THE PREFERRED EMBODIMENT

The radio station program distribution system of this invention allows customers, from the convenience of their own telephones, to order custom recordings of music heard on the radio. A customer calls into the system and identifies musical programs she would like on her custom recording by giving the time, date and broadcaster relating to when she heard the program broadcast on the radio. The system will tell her the title and artist who performed the music, offer her a preview of the music, and allow her to confirm that she has identified the programs she desires. After she has requested all of her desired programs and has given billing and shipment information, the system creates a custom recording containing her programs. This custom recording is then shipped to the customer. It is anticipated that television stations, cable systems and satellite broadcasters that broadcast music or music videos could participate in the system of this invention, and as such the term "radio station" in the specification and claims should be interpreted to include all forms of broadcasters.

Figure 1:
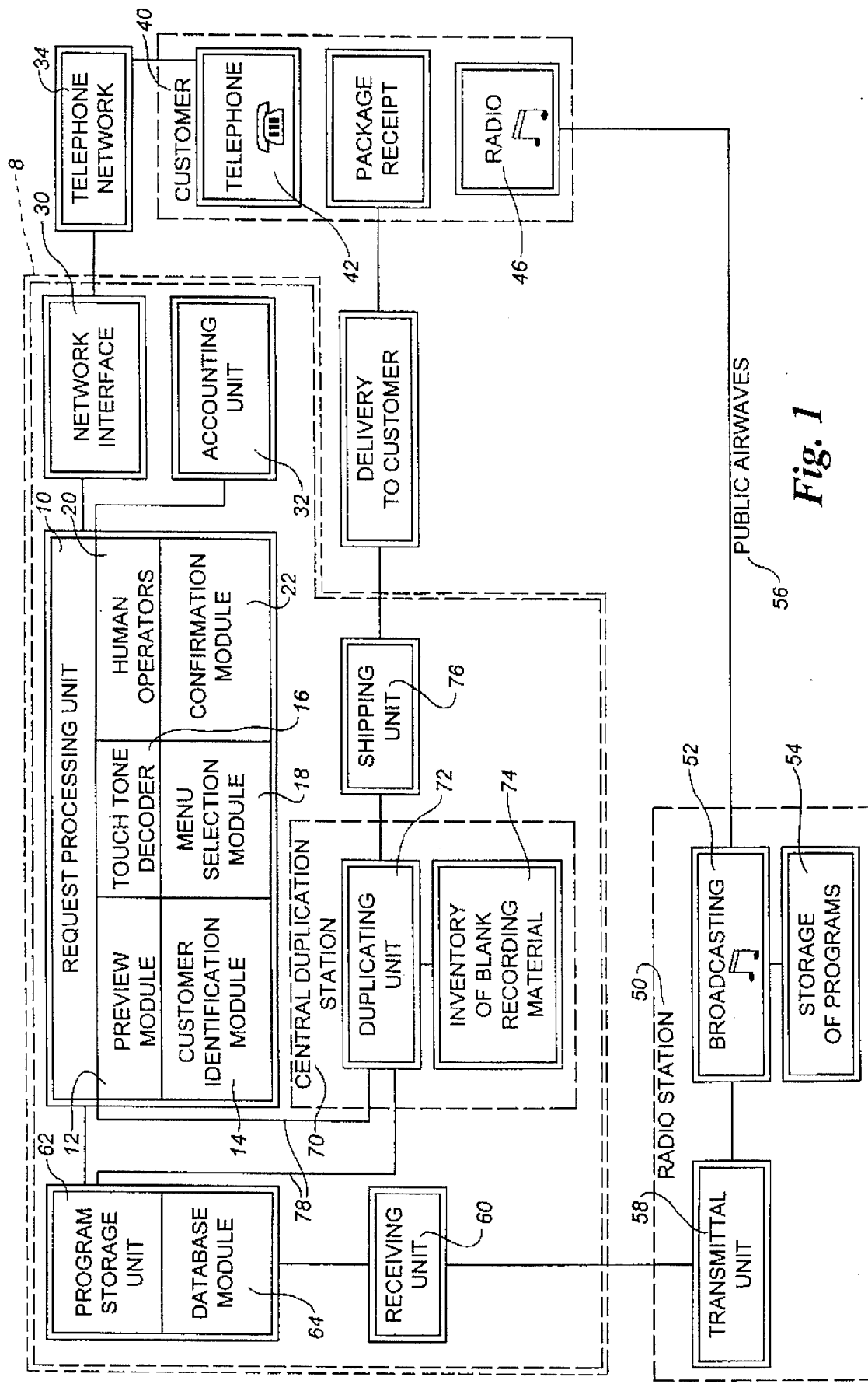
FIG. 1 is a block diagram of a radio station program distribution system according to the present invention, shown in conjunction with a radio station, a customer, and their interaction with the system.

Referring now to FIG. 1, a radio program distribution system 8 stores copies of broadcasted programs on a program storage unit 62 which has a database module 64 for indexing the stored programs by time, date and broadcaster information. The system 8 further includes a request processing unit 10 for receiving and processing remote customer requests for custom recordings, and a network interface 30 for linking remote requests appliances to the system. Interconnected to the program storage unit 62 and the request processing unit 10 is a central duplication station 70. The central duplication station 70 is responsive to information from the request processing unit 10 and creates a custom recording of requested programs. The system 8 also includes a shipping unit 76 for shipping custom recordings to customers 40.

A radio station 50 broadcasts music and other programs over public air waves 56. The radio station 50 operates in a conventional manner, having a system for storing music 54 and a broadcasting antenna 52. A radio station 50 needs to participate in the radio station program distribution system 8 in order for the system 8 to be able to identify programs based on time, date and broadcaster. A radio station 50 that participates in the system 8 has a transmittal unit 58 which transmits to the system 8 program information pertaining to programs that are broadcasted. The program information transmitted by the transmittal unit 58 is sufficient to identify the title of the program, the artist, royalty information, as well as the time, date and broadcaster that this program was broadcasted.

The program information that is transmitted by the transmittal unit 58 comprises an identifying reference tag unique to the program, as well as the time, date and broadcaster of the program's broadcast. The reference tag is then used by a database to identify the title, artist, and royalty information of the program. In one embodiment, the transmittal unit 58 comprises electronic components for transmitting electronic data representing the program information by radio waves or over a telephone or data network. If the information is transmitted over radio waves, it could be transmitted either over a subcarrier of the frequency on which the radio station normally broadcasts or over a separate frequency. It is envisioned that as communications technology proceeds forward, there will be alternative ways which are more efficient to transmit the program information.

In an alternative embodiment, the transmittal unit 58 comprises a log book containing entries sufficient to represent the program information. A radio station 50 using a log book as its transmittal unit 58 transmits the program information contained in the log book by delivering a photocopy of the log book entries for each day to the system 8. Alternatively, the transmittal unit 58 could comprise the regular radio broadcast in conjunction with a person at the system 8 listening to a radio tuned to the frequency of the radio station 50 and transcribing program information. The key requirement of the transmittal unit 58 is that it functions to transmit to the system 8 a log of program information tracking broadcasted programs.

While it is not necessary that the transmittal unit 58 transmit continuously, it is advantageous so that the system 8 will have time and date information identifying programs contemporaneously as the programs are broadcasted. This allows a customer 40 to call the system 8 immediately upon or after hearing a program that was broadcasted and to be able to hear the title, the artist and a preview of the program before completing an order. It is possible for the system 8 to work, however, if the transmission occurs only at spaced intervals, such as hourly or daily.

A receiving unit 60 receives the transmission of program information from each participating radio station 50. It is anticipated that standard commercial communications and data equipment could be configured to form the receiving unit 60.

A program storage unit 62, with a database module 64, stores and indexes programs. The program storage unit 62 preferably is a computer having large data storage capabilities, capable of storing music in a digital format. The database module 64 is a standard database management system indexing programs stored on the program storage unit 62.

New musical selections are loaded into the program storage unit 62 by copying data representing the music from a computer disk, or by copying a data transmission from the publisher of that piece of music, or in other conventional ways. To maintain the highest quality for reproduction, the program storage unit 62 stores programs in a digital format rather than an analog format.

Figure 2:
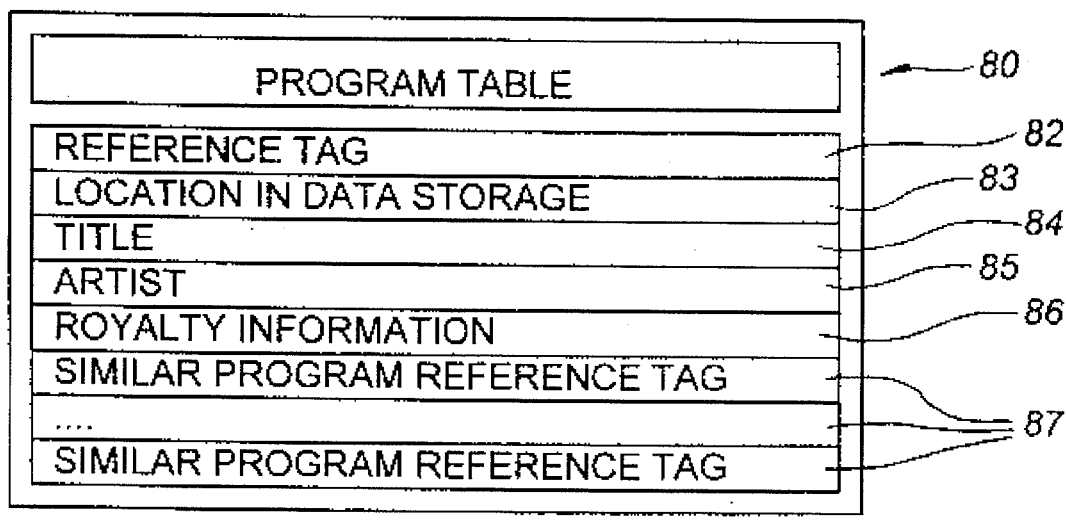
FIG. 2 is a diagram of fields in a program table on a database containing an entry for each program stored on the system.

Referring now to FIG. 2, the database module 64 has a program table 80. For each program loaded on the system 8, an entry in the program table 80 is created. The program table 80 contains fields for a unique reference tag 82, location in data storage for the program 83, title 84, artist 85, royalty information 86, and multiple fields for reference tags to similar programs 87. Using the reference tag 82, information about a particular program, as well as an audio copy of that program, can be accessed.

Figure 3:
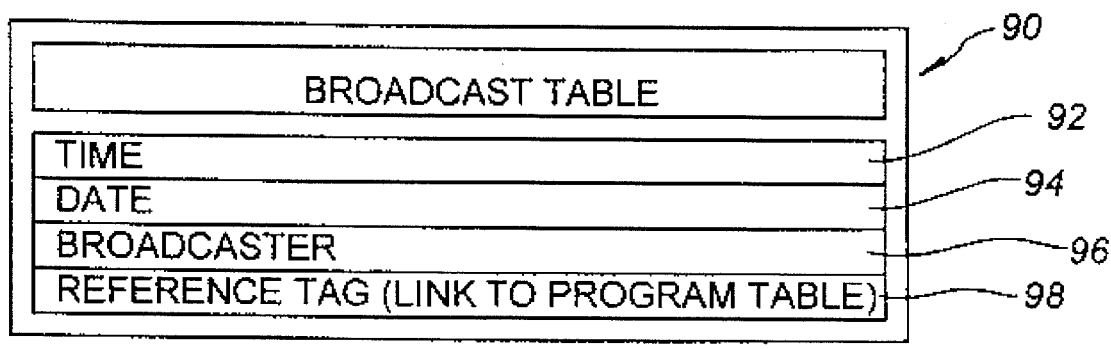
FIG. 3 is a diagram of fields in a broadcast table on a database containing entries for each occasion that a program was broadcast on a participating radio station.

Referring now to FIGS. 1 and 3, the database module 64 also has a broadcast table 90. For each program broadcasted by a participating radio station 50, an entry in the broadcast table 90 is created. The broadcast table 90 contains fields for time of broadcast 92, date of broadcast 94, broadcaster (i.e. radio station) 96, and a reference tag 98 for the broadcasted program corresponding to an entry in the program table 80.

When the receiving unit 60 receives program information from the transmittal unit 58, this program information is written into a record in the broadcast table 90. Receiving and creating entries in the broadcast table 90 of the database module 64 is an automatic function programmed into the receiving unit 60 and the database module 62.

Referring now to FIG. 1, in a preferred embodiment, a computer, possibly the same computer as is used for the program storage unit 62, forms the core of a request processing unit 10. The request processing unit 10 could, however, be comprised of a group of telephone operators having access to information in the database module, but it is envisioned that this embodiment would be less efficient and more costly than an automated computer-based request processing unit 10.

The request processing unit 10 is connected to the national telephone network 34 via a network interface 30, with the capability of utilizing multiple telephone connections simultaneously. The network interface 30 should have a flexible capacity, permitting upgrades to allow more customers to be connected simultaneously as demand for the system 8 changes in a given market.

The request processing unit 10 has several modules designed for offering particular features. A touch tone decoder module 16, formed from standard telecommunications equipment such as that found in conventional voice mail systems, allows the request processing unit 10 to interpret and respond to tone signals generated by buttons being pushed on a touch tone telephone 42. Additionally, human operators 20 serve as part of the request processing unit 10, permitting interaction with customers 40 who do not have or do not wish to press buttons on a touch tone telephone 42, as well as to collect information such as a shipment address which is cumbersome to enter by button presses on a touch tone telephone 42.

The request processing unit 10 has a confirmation module 22. The confirmation module 22 sends to the database module 64 a set of date, time and broadcaster information entered by a customer 40. The database module 64 uses this information to identify which broadcasted program corresponds to the customer's 40 request, and sends information about that program back to the confirmation module 22. The confirmation module 22 then prompts the customer 40 with the title of a program and the artist's name, and asks the customer 40 if the system 8 has identified the program that she would like to order. The confirmation module 22 then asks the customer 40 to confirm this order by pressing certain buttons on her telephone 42.

The request processing unit 10 has a preview module 12 which is used in conjunction with the confirmation module 22. The preview module 22 sends the database module 64 a set of date, time and broadcaster information entered by a customer 40. The database module 64 uses this information to identify which broadcasted program the customer has requested, and retrieve from the program storage unit 62 data representing an excerpt from the program. This data is sent to the preview module 12, which plays a small portion of a program for the customer 40, helping the customer 40 to determine whether or not the program identified by the system 8 is a program that she would like to order. The length of preview segments played by the preview module 12 can be set by the operator of the system 8.

A menu selection module 18 of the request processing unit 10 allows the customer 40 to select certain items from menus that are given over the telephone. One function of the menu selection module 18 is to allow the customer 40 to choose the radio station from a menu of participating stations. Another function of the menu selection module 18 is to allow the customer 40 to enter an approximate time or a time range, and then to pick the desired program from a menu of programs broadcasted within that time range or temporally close to the entered time. This list is obtained by retrieving information from the database module 64 corresponding to programs broadcast within a time range by a particular broadcaster. The menu selection module 18 also is used to select similar programs from a list provided by the request processing unit 10. This list of similar programs is entered by the operator of the system 8 into the program table 80. The system 8 may optionally be set to always present customers with a menu of similar programs or programs broadcasted temporally close to the entered time.

A customer 40 uses a telephone 42 to call into the request processing unit 10 and to order a custom recording. The customer 40 presses buttons on the telephone 42 to enter the time, date and broadcaster of a particular musical program she heard broadcasted on the radio 46. The request processing unit 10 tells the customer 40 the title and the artist who recorded the musical program, and asks the customer if she would like to confirm the order, hear a preview of the program, hear a list of titles broadcasted temporally close to the time that was entered, or hear a list of similar music, any of which could be previewed and then requested. For customers without touch tone telephones, this process would take place using a human operator 20. Additionally, a customer 40 can order particular pieces of music directly even if she has not heard the music broadcast on the radio 46 or does not know the approximate time, date or broadcaster. It is also envisioned that a customer 40 could also use specialized vending machines, computer networks or interactive television to place orders.

The request processing unit 10 also has a customer identification module 14 for gathering billing and shipment information about the customer 40. The first time that a customer 40 uses the system 8, a human operator 20 gathers the billing information and shipping information, and the customer 40 is given a customer identification number. If the customer 40 has previously ordered from the system 8, she enters her customer identification number by using the buttons on a touch tone telephone 42. The customer identification number allows the customer identification module 14 to retrieve billing and shipment information for the customer 40 without the need of using a human operator 20. For areas of the country in which Automatic Number Information is available (e.g. Caller I.D. type services), the telephone network 34 automatically passes the customer's 40 telephone number to the customer identification module 14. Using the customer's 40 telephone number, the customer identification module 14 is able to look up the customer's 40 name, billing information, and shipment address without the customer 40 having to enter any information. The system 8 accepts credit cards which are automatically validated through commercial credit card validation services.

A general purpose computer, which could be the same computer used in the request processing unit 10 or the program storage unit 62, forms the core of an accounting unit 32. The accounting unit 32 gathers data from the request processing unit 10 relating to customer orders and bills customers for the selections which they have ordered. The accounting unit 32 also keeps track of which musical selections have been ordered and which radio stations' broadcasts generated the orders. Using this information, as well as information from the database module 64, the accounting unit 32 processes royalty payments which need to be made to the holder of the copyright in the programs ordered, and fees to radio stations whose broadcasts generated orders.

At a central duplication station 70, custom recordings are created and then shipped to customers. An inventory of blank materials for making recordings 74 which are used to make custom recordings is stored at the central duplication station 70. A duplicating unit 72 receives an order from the request processing unit 10 for a custom recording and, using the database module 64, retrieves the requested programs electronically from the program storage unit 62. Textual information for a cover jacket for the custom recording is retrieved from the database module 64. A custom recording is created, such as a compact disk, an analog audio tape, a digital audio tape or other musical storage format. The type of equipment used for duplicating unit 72 is conventional and depends on the medium being used for recordings and the volume of custom recordings that the system 8 will process.

It may be economically advantageous for the central duplication station 70 to be in a different location than the request processing unit 10 and the program storage unit 62. The reason for doing so may be to reduce equipment costs by using existing third party facilities for producing compact disks, which currently require expensive equipment. If the duplicating unit 72 is located apart from the other units in the system 8, a high capacity data link 78 is used to connect them.

A shipping unit 76 receives the customer's 40 name and shipping address from the customer identification module 14 of the request processing unit 10. The custom recording is then shipped to the customer 40 by the mail or a delivery service.

In an alternative embodiment, the transmittal unit 58 transmits, in addition to the time, date, broadcaster and program information specified above, a complete electronic copy of the program that was broadcasted. The receiving unit 60 takes this electronic copy of the broadcasted program and stores it in the program storage unit 62. In this embodiment, the program storage unit 62 contains a complete copy of the entire broadcast of every participating radio station 50, rather than a single stored copy of each program and a database entry for each occurrence that a program was broadcasted. Using this embodiment, the operator of the system 8 would not need to purchase or update its collection of programs, as this is done automatically every time a participating radio station 50 broadcasts a new program. This embodiment, however, requires an enormous data storage capacity to hold and quickly access the complete broadcasts of every participating radio station 50, as well as the equipment costs necessary to insure that the transmittal unit 58 transmits to the program storage unit 62 a high quality copy of the programs. Additionally, there are problems associated with a radio station 50 overlapping two programs when switching from the end of one program to the next, or the disc jockey speaking while a program is beginning or ending.

The preferred embodiment of the system 8 has been described as an example of the invention as claimed. However, the present invention should not be limited in its application to the details illustrated in the description of the preferred embodiment and in the accompanying drawings since the invention may be practiced or constructed in a variety of different embodiments. Also, it must be understood that the terminology and descriptions employed herein are used solely for purpose of describing the general operation of the preferred embodiment and therefore should not be construed as limitations on the operability of the invention.

What is claimed is:

1. A program distribution system comprising:
    a program storage unit for storing programs and having a database module for indexing stored programs by time, date and broadcaster information;
    a request processing unit for receiving and processing remote customer requests for custom recordings, wherein the request processing unit identifies and selects which programs a customer is requesting based on time, date and broadcaster information of broadcasted programs;
    a network interface for linking remote request appliances to the request processing unit;
    a central duplication station having a duplicating unit interconnected to request processing unit, the program storage unit and the database module for creating custom recordings, wherein the duplicating unit is responsive to information from the request processing unit, and, by utilizing information from the database module and programs from the program storage unit, the duplicating unit creates a custom recording of a requested plurality of programs; and
    a shipping unit for shipping a custom recording from the central duplication station to a customer.

2. The system of claim 1 wherein the program storage unit includes electronic memory for storing programs in a digital format.

3. The system of claim 1 wherein the network interface includes a telephone interface for linking telephones to the request processing unit via a telephone network.

4. The system of claim 3 wherein the request processing unit includes tone actuated circuitry responsive to tone signals generated by buttons being pushed on a touch tone telephone.

5. The system of claim 1 wherein the request processing unit includes a confirmation module for providing identifying information to a customer for each requested program and then requiring customer confirmation of each requested program before completing an order.

6. The system of claim 1 wherein the request processing unit includes a preview module for providing a customer with a preview of each requested program.

7. The system of claim 1 wherein the request processing unit includes an approximate time menu selection module for receiving a customer request based on date, broadcaster and approximate time information, and presenting the customer with a menu of programs broadcast temporally close to the time that the customer requested.

8. The system of claim 1 wherein the request processing unit includes a similarity menu selection module for presenting a customer with a menu of programs that are similar to that which the customer requested.

9. The system of claim 1 wherein the request processing unit includes a broadcaster menu selection module for presenting a customer with a menu of broadcasters from which to choose.

10. The system of claim 1 wherein the request processing unit includes a customer identification module for gathering and processing billing and shipping information about customers using the system.

11. The system of claim 10 wherein the customer identification module includes means for accepting and validating credit card payment information.

12. The system of claim 1 further comprising:
    a transmittal unit located at each participating broadcaster for transmitting program information about broadcasted programs; and
    a receiving unit for receiving transmitted program information from participating broadcasters and relaying the program information to the program storage unit.

13. The system of claim 12 wherein each transmittal unit includes means for transmitting program information from each broadcaster to the receiving unit by radio signals.

14. The system of claim 12 wherein each transmittal unit includes means for transmitting program information from each broadcaster to the receiving unit over an information network.

15. The system of claim 12 wherein each transmittal unit includes means for continuously transmitting program information.

16. The system of claim 12 wherein each transmittal unit includes means for transmitting program information in a digital format.

17. The system of claim 12 wherein the program storage unit includes means for storing a single copy of each broadcasted program, the transmittal unit includes means for transmitting an identifying reference tag for each broadcasted program, and the database module includes means for holding a plurality of entries corresponding to each broadcast by a participating broadcaster, such that an entry in the database module links each broadcasted program to the copy of the broadcasted program stored in the program storage unit.

18. The system of claim 12 wherein the transmittal unit includes means for transmitting an electronic version of each broadcasted program, and the program storage unit includes means for storing copies of the electronic versions of broadcasted programs as received by the receiving unit.

19. A method of vending custom recordings comprising the steps of:

storing broadcasted programs on a program storage unit;

indexing the programs stored on the program storage unit by time, date and broadcaster information of when and by which broadcaster the programs were broadcasted;

receiving and processing a remote request from a customer identifying by time, date and broadcaster information a plurality of programs that the customer wants on a custom recording;

duplicating the requested plurality of programs from the program storage unit and creating a custom recording containing those programs; and shipping the custom recording to the customer.

20. The method of claim 19 wherein receiving requests includes receiving telephone requests.

21. The method of claim 20 wherein the step of receiving and processing a remote request includes prompting the customer for and responding to touch tone signals.

22. The method of claim 19 wherein the step of receiving and processing a remote request includes providing identifying information to the customer and prompting the customer to confirm an order before the order is completed.

23. The method of claim 19 wherein the step of receiving and processing a remote request includes providing the customer with a preview of each requested program.

24. The method of claim 19 wherein the step of receiving and processing a remote request includes providing the customer with a menu of programs broadcast temporally close to the time that the customer requested.

25. The method of claim 19 further comprising the step of prompting the customer with a menu of programs that are similar to the program which the customer has requested.

26. The method of claim 19 wherein the step of receiving and processing a remote request includes providing the customer with a menu of broadcasters to facilitate choosing a broadcaster.

27. The method of claim 19 wherein the step of receiving and processing a remote request includes gathering billing and shipping information.

28. The method of claim 27 wherein the step of gathering billing information includes requesting and validating a credit card number.

29. The method of claim 19 further comprising the steps of:

transmitting program information about broadcasted programs from each participating broadcaster; and receiving the program information from each participating broadcaster and relaying the program information to the program storage unit.

30. The method of claim 29 wherein the step of transmitting program information includes transmitting an electronic version of each broadcasted program, and the step of storing programs includes storing the electronic version that is received from broadcasters in the program storage unit.

31. The method of claim 29 wherein the step of transmitting program information includes transmitting an identifying reference tag for each broadcasted program, and the step of storing programs includes storing a single copy of each broadcasted program and creating an entry in a database corresponding to each broadcast by a participating broadcaster.

* * * * *